(12) United States Patent
Standke et al.

(10) Patent No.: US 6,239,194 B1
(45) Date of Patent: May 29, 2001

(54) SURFACE-MODIFIED FILLERS, PROCESS FOR THEIR PREPARATION AND THEIR USE

(75) Inventors: Burkhard Standke, Lörrach; Jaroslaw Monkiewicz; Albert-Johannes Frings, both of Rheinfelden; Ralf Laven, Schwörstadt; Roland Edelmann, Wehr; Peter Jenkner, Rheinfelden; Helmut Mack, Rheinfelden; Dieter Barfurth, Rheinfelden; Michael Horn, Rheinfelden, all of (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/300,450

(22) Filed: Apr. 28, 1999

(30) Foreign Application Priority Data

Apr. 28, 1998 (DE) .............................................. 198 18 924

(51) Int. Cl.$^7$ ................................ C08K 3/20; C08K 3/36
(52) U.S. Cl. ...................... 523/200; 523/216; 523/340; 523/205; 428/405; 524/401; 524/403; 524/451; 524/497; 524/449; 524/492; 524/425; 524/448; 524/445; 528/32; 528/38; 528/41; 549/215; 427/212
(58) Field of Search ...................... 523/200, 216, 523/340, 205; 428/405; 524/401, 403, 451, 497, 449, 492, 425, 448, 445; 528/32, 38, 41; 549/215; 427/212

(56) References Cited

U.S. PATENT DOCUMENTS

| 3,122,516 | 2/1964 | Polmanteer . |
|---|---|---|
| 5,543,173 | 8/1996 | Horn et al. . |
| 5,571,851 | 11/1996 | Freeman et al. . |
| 5,629,400 | 5/1997 | Standke et al. . |
| 5,679,147 | 10/1997 | Standke et al. . |

FOREIGN PATENT DOCUMENTS

| 196 39 782 | 4/1998 | (DE) . |
|---|---|---|
| 196 39 783 | 4/1998 | (DE) . |
| 0 492 223 | 7/1992 | (EP) . |
| 0 590 270 | 4/1994 | (EP) . |
| 0 632 109 | 1/1995 | (EP) . |
| 0 675 128 | 10/1995 | (EP) . |
| 0 716 127 | 6/1996 | (EP) . |
| 0 716 128 | 6/1996 | (EP) . |
| WO 90/02779 | 3/1990 | (WO) . |

Primary Examiner—Robert Dawson
Assistant Examiner—Kuo-Liang Peng
(74) Attorney, Agent, or Firm—Oblon, Spivak, McClelland, Maier & Neustadt, P.C.

(57) ABSTRACT

The present invention relates to surface-modified fillers obtained by mixing a filler with water, adding an water-based organosiloxane composition with very thorough mixing, wherein the organosiloxanes are soluble in water and contain, in addition to OH groups, at least one amino-functional group and optionally a functional group from the series consisting of alkyl, haloalkyl, alkenyl, glycidyl ether alkyl, acryloxyalkyl and methacryloxyalkyl, and wherein a functional group is bonded to each silicon atom of the organosiloxane, and drying the mixture. The present invention also provides a process for the surface modification of fillers, their use and ethylene-vinyl acetate copolymer compositions which include the surface-modified fillers.

19 Claims, No Drawings

SURFACE-MODIFIED FILLERS, PROCESS FOR THEIR PREPARATION AND THEIR USE

BACKGROUND OF THE INVENTION

1. Field of the Invention

The present invention relates to surface-modified fillers and a process for modifying the surfaces of fillers using a water-based organosiloxane-containing composition; wherein the organosiloxanes are soluble in water and contain OH groups and at least one amino-functional group and, optionally, at least one functional group from the series consisting of alkyl, haloalkyl, alkenyl, glycidyl ether alkyl, acryloxyalkyl and methacryloxyalkyl, wherein one of tide functional groups is bonded to each silicon atom of the organosiloxane. The present invention also relates to the use of the surface-modified fillers and to compounds containing the surface-modified fillers and an ethylenevinyl acetate copolymer.

2. Discussion of the Background

In general, fillers are used as additives, inter alia for adhesives, sealants, polymer compositions and paints. These fillers are normally inorganic materials, it being possible to choose between inactive and active products, Fillers can be used to modify specific mechanical and/or physical properties of a polymer matrix: the so called "reinforcing fillers". Since the reinforcing function can vary, a definition is only possible in conjunction with the polymer used in each case. In the case of rubber and synthetic elastomers, it is possible, for example, to vary the properties of hardness, strength, elasticity and elongation.

Reinforcing fillers, apart trom pyrogenic silica and carbon black, have hitherto played a relatively unimportant role, however, and, until recently, fillers have been used mainly as extenders in order to prepare products at lower cost. The increase in price of base polymers, however, has led to a reconsideration of the role of fillers, Nowadays, the aim is rather to maintain the balance between cost and performance through the targeted replacement of the base polymers with specially coated fillers.

Although pretreated fillers are more expensive than the conventional types, their prices are not drastically increased as a result of coating since great effects and improvements can be achieved using small amounts of coating material.

Using the preparation of alumimnum hydroxide as an example, the above situation may be briefly illustrated. Aluminum hydroxide (ATH), in the form of ground or as finely divided crystals, is used as a filler and flame retardant wherever the processing temperatures are not significantly above 200° C. ATH is halogen-free, noncorrosive, nontoxic, physiologically acceptable and highly efficient in reducing smoke density.

ATH is offered in a variety of qualities, matched to the particular properties of important plastics systems. ATH can be incorporated in high filling contents from 50 to 70%) in elastomers to be crosslinked, thermoplastics and thermoplastic elastomers, duromers, PVC, ethylene-vinyl acetate copolymers and dispersions.

Fillers are usually modified in an additional process step either after drying the mineral or after processing it by grinding (cf. FIG.1): Diagram 1: Diagram of the preparation of silanized aluminum hydroxide

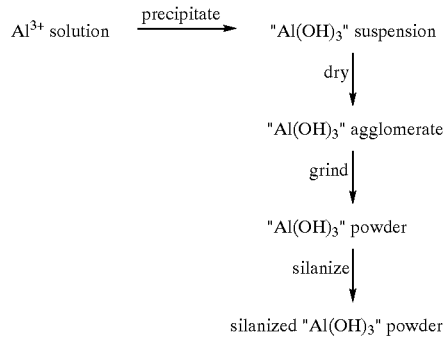

Silanization is typically carried out either dry (spraying the alkoxysilane into special mixing units), wet/slurry (application of an aqueous or alcoholic silane/solvent mixture), direct (the addition of liquid silane during compounding) or by spraying a silane emulsion onto the heated filler.

For work-up, many mineral fillers, after their separation from gangue and impurities, are slurried with water, hydro-classified and dried.

Thus, the surface properties of fillers can be modified by treatment with organoalkoxysilanes, organoalkoxysilane mixtres or organoalkoxysilane polycondensates, which are optionally present in dissolved form in organic solvents (U.S. Pat. No. 5,571,851, EP 0 632 109 A1, EP 0 590 270 A2, EP 0 492 223 A2, WO 90/02779). In these cases, when water or hydroxyl groups are present, significant amounts of alcohol arm liberated by hydrolysis. Moreover, processes in which organic solvents are present can usually only be carried out with special, cost-intensive safety measures.

EP 0 716 128 A2, FP 0 716 127 A2, EP 0 675 128 A1 and the as yet unpublished German Patent Application No. 196 39 782.0 disclose stable compositions of water-soluble organosiloxanes which are used, inter alia, for the silanization of fillers. Such water-based systems, when diluted with water, do not liberate any alcohols by hydrolysis.

U.S. Pat. No. 5,543,173 discloses a method for reducing the tendency of inorganic powders, for example aluminum hydroxide, to agglomerate, which includes treating the powder with an optionally alcohol-containing solution including organosiloxanes that can be obtained by hydrolysis of an organotrialkoxysilane, for example a vinyltialkoxysilane, an alkyltrialkoxysilane, a haloalkyltrialkoxysilane or an epoxy-, methacryloxy- or an amino-functional trialkoxysilane, the degree of oligomerization being greater than 2 and below the gel point, and then subsequently drying the treated powder. According to U.S. Pat. No. 5,543,173, powders treated in this way can be used in polymer blends.

SUMMARY OF THE INVENTION

The object of the present invention is to provide a method which permits simple, effective and economic modification of the surface of fillers, and in particular aluminum hydroxide.

The desired object is achieved according to the invention in accordance with the details in the patent claims.

The first embodiment of present invention provides a process for modifying the surface of fillers by
  mixing a filler with water,
  adding a water-based organosiloxane composition with mixing to form a mixture, wherein the water-based organosiloxane composition includes a water-soluble organosiloxane having at least one OH group and at least one aminofunctional group, and, optionally, a functional group selected from the group consisting of alkyl, haloalkyl, alkenyl, glycidyl ether Bikyl, acryloxyalkyl and methacryloxyalkyl, and wherein a fictional group is bonded to each silicon atom of the organosiloxane, and the drying mixture.

The second embodiment of present invention provides a surface-modified filler, which includes the reaction product of mixing a filler with water, adding a water-based organosiloxane composition with mixing to form a mixture, wherein the water-based organosiloxane composition includes a water-soluble organosiloxane having at least one OH group and at least one aminofunctional group, and, optionally, a functional group selected from the group consisting of alkyl, haloalkyl, alkenyl, glycidyl ether alkyl. acryloxyalkyl and methacryloxyalkyl, and wherein a functional group is bonded to each silicon atom of the organosiloxane, and drying the mixture.

DESCRIPTION OF THE PREFERRED EMBODIMENTS

Various other features, objects and attendant advantages of the present invention will be more fully appreciated as the same becomes better understood from the following detailed description, which is not intended to be limiting unless otherwise specified.

It is preferable to surface-modify both aluminum hydroxide, in particular as obtained from its preparation and in the form of an aqueous suspension or a moist filter cake, and also other mineral fillers, in particular silicates, such as kaolin, bentonite, montmorillonite, talc, mica, for example Muscovite mica, in particular also magnesium hydroxide, silica, for example precipitated silica, pyrogenic silica, or titanium dioxide and also calcium carbonate. such as chalk or dolomite, in a simple and economic manner and with excellent success as regards the resuspendability and the application properties (in particular in compounds) by Silanization, by mixing the filler, provided it is suitably not already water-moist or present in an aqueous suspension, with water, and adding a water-based organosiloxane-containing composition with very thorough mixing and drying the resulting mixture, the present organosiloxanes being soluble in water and, in addition to OH groups, containing at least one amino-functional group and optionally at least one other functional group selected from the series consisting of alkyl, haloalkyl, alkenyl, glycidyl ether alkyl, acyloxyalkyl and methacryloxyalkyl, wherein one of the functional groups is bonded to each silicon atom of the organosiloxane.

The method of the present invention advantageously produces a usually pumpable mixture which preferably has a solids content in the range between 10 and 70% by weight, preferably between 30 and 60% by weight, at a viscosity in the range from 10 to 20,000 mPa s, preferably from 20 to 1000 mPa s, particularly preferably from 100 to 600 mPa s. The mixture is preferably spray dried, after which the surface-treated filler may preferably be resuspended in, for example, pentane or xylene, without the formation of agglomerates. This can be particularly advantageous, for example, during incorporation into compounds.

When fillers modified according to the invention are used in polymer compositions, there is an improvement in the adhesion between filler and polymer. Improved mechanical properties and-chemical resistance of the composites are advantages worthy of particular mention Fillers having color-imparting properties, also called pigments, for example white pigment, are also frequently used. Such fillers having color-imparting properties may also be treated according to the invention and used in a likewise advantageous manner.

The surfio-modification of the invention may, in the case of fillers or pigments, advantageously influence the Theological properties by modifying the wetting, dispersion, viscosity, thixotropy and flow behavior in binders.

The water-based organosiloxane-containing composition used for the silanization according to the invention preferably includes organosiloxanes which contain, as functional groups, essentially (i) aminoalkyl groups or (ii) aminoalkyl and alkyl groups or (iii) aminoalkyl and vinyl groups, particular preference being given to organosiloxanes which contain 3-aminopropyl groups as the amino functional group, Surface-modified fillers according to the invention are preferably aluminum hydroxide, magnesium hydroxide, chalc, dolomite, talc, kaolin, bentonite, montmorillonite, mica, silica and titanium dioxide.

Preferably, the present invention also provides a process for the modification of the surface of fillers using a water-based organosiloxane-containing composition, wherein the organosiloxanes are soluble in water and contain OH groups and at least one amino-functional group and, optionally, at least one other organofunctional group consisting of alkyl, haloalkyl, alkenyl, glycidyl ether alkyl acryloxyalicyl and methacryalkyl, and wherein one of the organofunctional groups is bonded to each silicon of an organopiloxane, wherein the filler is mixed with water, the water-based organosiloxane-containing composition is added with very thorough mixing, and the mixture is dried.

Preferable water-based organosiloxane-containing compositions are disclosed in EP 0 716 127 A2, EP 0 716 128 A2, EP 0 675 128 A1, unpublished German Patent Application No. 196 39 782.0 and the parallel application entitled "Stable compositions of watesoluble amino- and alkenyl-functional organosiloxanes, process for their preparation and their use" (the entire contents of each of which are hereby incorporated by reference). In addition, the abovementioned patents describe the preparation of the preferred organosiloxane-containing compositions.

Preferably, the water-based organosiloxane-containing composition of the invention has an organosiloxane content of 10 to 150 g of Si/kg of solution, preferably from 60 to 130 g/kg, particularly preferably from 90 to 120 g/kg is used in the process of the invention.

In addition, it is preferable to use a water-based organosiloxane-containing composition having a pH of from 2 to 6 or from 7.5 to 12, particularly preferably from 3 to 5 or from 10 to 12.

The process according to the invention is particularly economically and ecologically advantageous if a water-based organosiloxane-containing composition with a content of alcohols of less than 0.5% by weight, preferably less than 0.1% by weight, is used, meaning that it is possible to largely dispense with special safety requirements in parts of the plant because of a possible release of hydrolysis alcohols. Moreover, by use of the process according to the invention, the streams of exhaust air do not additionally have to be freed from high VOC contents (VOC=volatile organic compounds).

The process according to the invention is preferably carried out by mixing the filler to be treated with and adding au organosiloxane-containing composition of the type described above with very thorough mixing. Even after a short time, the resulting mixture usually displays a tic drop in viscosity.

In the process according to the invention, the amount of organosiloxane used is preferably from 0.1 to 12% by weight per kg of product to be silanized, in which case the resulting mixture, before it is dried, suitably has a viscosity of from 10 to 20,000 mPa s at a filler content of from 10 to 70% by weight.

Despite having a comparatively low water content, the resulting mixture is generally pumpable and can be easily dried. Drying is preferably carried out at a temperate in the range from 40 to 120° C., preferably from 80 to 110° C.

It is, however, also possible to filter the mixture prior to drying and then dry the filter residue, for example by belt drying.

In the process according to the invention, the mixture is preferably dried using a spray drier. The process according to the invention can suitably be integrated into processes for the preparation and processing of fillers.

Thus, in the preparation of aluminum hydroxide described in the introduction, cf. Diagram 1, the organosiloxane-containing composition can be added to the "Al(OH)3" suspension and then dried using a belt drier or preferably using a spray drier, and the energy intensive process stage of grinding may be omitted. Moreover, it is also possible to omit the additional process stage of silanization which has hitherto been necessary in conventional processes.

Furthermore, it is possible to subject the filler obtained according to the invention to size classification, although it is preferably used immediately after the drying stage in an advantageous manner, for example in polymer compounds.

Polymer compounds arc ready-to-process mixtures of polymers with a variety of additives, for example anti-aging agents, antioxidants, antistatics, flame retardants, fillers, vulcanization auxiliaries or plasticizers, which are required for preparation of the end products (in accordance with ASTM D-883).

The present invention thus also provides for the use of surface-modified novel fillers for adhesives, sealants, polymer compositions, for example high-temperature-ralcanizing silicone rubber (HTV compositions), paints and surface coatings.

The surface-modified fillers according to the invention are preferably used for the preparation of compounds based on an ethylene-vinyl acetate copolymer.

Here, too, the fillers according to the invention display unexpected advantageous properties.

Thus, when the silanized fillers according to the invention are used in ethylene-vinyl acetate systems, in particular when aluminum hydroxide, modified according to the invention, for example using DYNASYLAN® HS 2907, is used, there is a significant improvement in the tensile strength and, in an advantageous manner, a reduced absorption of water compared with a nonsilanized filler.

The present invention thus also provides compounds based on etbylenc-vinyl acetate copolymer which include the surface-modified fillers according to the invention.

The present invention is illustrated in more detail by die follow examples. (Note:DYNASYLAN® HS is abbreviated to DS).

EXAMPLES

Having now generally described the invention, a further understanding can be obtained by reference to certain specific examples, which are provided herein for purposes of illustration only and are not intended to be limiting unless otherwise specified.

Water-based organosiloxane-containing compositions

Example 1

DYNASYLAN® HS 1152 is a completely hydrolyzed, water-based organopolysiloxane system having a pH of 11 and containing 50.49 g of Si/kg of solution, which is prepared using 3-aminopropyltrialkoxysilane (AMEO) as starting material.

Example 2

DYNASYLAN® HS 2906 is also a completely hydrolyzed, water-based organopolysiloxane system having a pH of 4 and containing 28.52 g of Si/kg of solution, which is prepared using AMEO and PTMO propyltrimethoxysliane) in the ratio of 1:1 as starting material.

Example 3

DYNASYLAN® HS 2781 is also a completely hydrolyzed, water-based organopolysiloxane system having a pH of from 10 to 11 and containing 51.12 g of Si/kg of solution, which is prepared using AMEO and VTMO (vinyltrimethoxysilane) in the ratio of 2.5:1 as setting material.

Example 4

DYNASYLAN® HS 2907 is also a completely hydrolyzed, water-based organopolysiloxane system having a pH of 4 and containing 119.38 g of Si/kg of solution, which is prepared using AMEO and VTMO in the ratio of 1:1 as starting material.

Reduction in Viscosity

Example 5

1% by weight of DYNASYLAN® HS 2907 was added to a 60% strength aqueous "chalk paste". A drastic reduction in viscosity to less than 6% of the initial viscosity was observed. The filtered product dried at 110° C. can be readily suspended in pentane, while untreated chalk forms lumps.

Example B 500 g of aluminum hydroxide, abbreviated to ATH below, (Martinal® OL-107) and 500 g of deionized water are thoroughly mixed in a high-speed stirrer to give a paste, 1% by weight of DYNASYLAN® HS 2781 (from Example 3), based on ATH, is added in portions with stirring, and the viscosity is in each case measured after a period of 3 minutes using a Brookfield viscometer (rotation viscometer RVT, spindle 5/6), cf Table 1.

Example 6

Example B is repeated in a corresponding manner using DYNASYLAN® HS 2907 (from Example 4), cf. Table 1.

The comparison with Example B shows that the viscosity of the initial ATH paste can be lowered in a very effective and clear manner even using comparatively small amounts of DYNASYLAN® HS 2907 compared with DYNASYLAN® HS 2781.

Both in the case of filtered (subsequently dried at 110° C. in a drying cabinet) and in the case of spray-dried DYNASYLAN® HS 2907-ATH samples, dispersed properties are visible using a direct-light microscope. There is no agglomeration to secondary particles as is the case with unheated ATH.

Good dispersibility is particularly evident in nonpolar solvents, such as pentane and xylene. Compared with "filtered and dried ATM", the bulk density of the "spray dried ATH" is significantly lower (25 g/100 ml compared with 25 g/25 ml) and corresponds to the untreated ATH starting material.

TABLE 1

Viscosity titration for ATH (50% slurry in water) with DYNASYLAN ® HS 2907 and DYNASYLAN ® HS 2781.

| Amount of DS HS 2907 added (% calculated on ATH) | Measured viscosities after stirring for 3 min (mPa s) | Spindle speed (rpm) | Amount of DS HS 2781 added (% calculated on ATH) | Measured viscosities after stirring for 3 min (mPa s) | Spindle speed (rpm) |
|---|---|---|---|---|---|
| 0.0 | 95,000 | 10 | 0.0 | 95,000 | 10 |
| 0.5 | 14,000 | 10 | 2.0 | 25,000 | 10 |
| 0.75 | 10,000 | 10 | 4.0 | 19,000 | 10 |
| 1.0 | 1400 | 10 | 6.0 | 15,000 | 10 |
| 1.25 | 150 | 10 | 8.0 | 14,000 | 10 |

Example C

Example B is repeated in a corresponding manner using chalk (OMYALITED® 50), cf. Table 2.

Example 7

Example C is repeated in a corresponding manner using DYNASYLAN® HS 2907 (from Example 1), cf. Table 2).

Here, too, there is a significant reduction in viscosity after just a few minutes. The initial "chalk paste" is of low viscosity even after the addition of comparatively small amounts of DYNASYLAN® HS 2907, can be pumped without problems and dried in a bench spray drier,

TABLE 2

Viscosity titration for chalk (50% slurry in water) with DYNASYLAN ® HS 2907 and DYNASYLAN ® HS 2781.

| Amount of DS HS 2907 added (% calculated on ATH) | Measured viscosities after stirring for 3 min (mPa s) | Spindle speed (rpm) | Amount of DS HS 2781 added (% calculated on ATH) | Measured viscosities after stirring for 3 min (mPa s) | Spindle speed (rpm) |
|---|---|---|---|---|---|
| 0.0 | 3800 | 10 | 0.0 | 3800 | 10 |
| 0.5 | 2000 | 10 | 1.0 | 2400 | 10 |
| 0.75 | 100 | 10 | 2.0 | 2100 | 10 |
| 1.0 | 100 | 10 | 5.0 | 1500 | 10 |

Particle Size Distribution

Example 8

The analyses of the particle size distributions (suspension auxiliary ethanol, 50 sec ultrasound treatment) of ATH treated with 1% by weight of DYNASYLAN® HS 2907, MDH treated wth 3.5% by weight of DYNASYLAN® HS 2907 and chalk treated with 1% by weight of DYNASYLAN® HS 2907 are summarized in Table 3.

The samples were filtered following DYNASYLAN® HS treatment and dried for 24 hours at 110° C. in porcelain dishes.

TABLE 3

Analysis of the particle size distribution of ATH, magnesium hydroxide (MDH) and chalk, treated with 1% of DYNASYLAN ® HS 2907.

| | ATH | | MDH | | Chalk | |
|---|---|---|---|---|---|---|
| | Blank | 1% of DS HS 2907 | Blank | 3.5% of DS HS 2907 | Blank | 1% of DS HS 2907 |
| 10% | 0.879 | 0.565 | 0.569 | 0.577 | 0.746 | 0.659 |
| 50% | 1.352 | 1.002 | 1.185 | 1.163 | 1.845 | 1.627 |
| 90% | 2.074 | 1.654 | 5.908 | 8.869 | 6.486 | 6.541 |
| mv | 1.425 | 1.071 | 3.021 | 3.918 | 3.127 | 3.047 |
| mn | 1.010 | 0.531 | 0.556 | 0.575 | 0.634 | 0.598 |

TABLE 3-continued

Analysis of the particle size distribution of ATH, magnesium hydroxide (MDH) and chalk, treated with 1% of DYNASYLAN ® HS 2907.

|    | ATH | | MDH | | Chalk | |
|----|-----|-----|-----|-----|-------|-----|
|    | Blank | 1% of DS HS 2907 | Blank | 3.5% of DS HS 2907 | Blank | 1% of DS HS 2907 |
| ma | 1.275 | 0.901 | 1.046 | 1.056 | 1.489 | 1.340 |
| cs | 4.708 | 6.662 | 5.735 | 5.684 | 4.030 | 4.479 |
| sd | 0.459 | 0.423 | 0.753 | 0.882 | 1.956 | 2.014 |

10%: Particle diameter in $\mu$m at 10% of the total amount passed through
50%: Particle diameter in $\mu$m at 50% of the total amount passed through, also called d50 or median
90%: Particle diameter in $\mu$m at 90% of the total amount passed through
mv: Average arithmetic particle diameter in $\mu$m of the volume distribution
mn: Mean arithmetic particle diameter in $\mu$m of the numerical distribution
ma: Mean arithmetic particle diameter in $\mu$m of the aerial distribution
cs: Specific surface area in $m^2/cm^3$ (calculated according to the ball model)
sd: Standard deviation of the particle size distribution (measurement of distribution breadth)

In the case of ATH treated with DYNASYLAN® HS 2907 there is a shift in the d50 median from 1.35 $\mu$m (untreated ATH) to 1.00 $\mu$m. The breakdown of the agglomerates into primary particles is preferably to be observed in the case of ATH treated with DYNASYLANS® HS 2907.

Compounding the Fillers in Ethylene-Vinyl Acetate Copolymer (EVA)

Example 9

The fillers surface-treated with DYNASYLAN® HS were incorporated into EVA. For this purpose, 40 parts of Exxon Escorene UL 00119 (EVA containing 19% of vinyl acetate) and 60 parts of ATH were premixed. Kneading was carried out in each case for 15 minutes at 180° C. in a kneading chamber (Haake measurement kneader). Disks were pressed from the compound (190° C./spacer 2 mm) and from these test rods were punched (in accordance with DIN 53 504 standard rod S2).

Mechanical properties were measured (tensile tests in accordance with DIN EN ISO 527-1 to 3, Zwick universal tester 1445). Table 4 summarizes the results.

The tensile strength is the maximum value in the stress/stain diagram. In the case of ATH-filled EVA compounds, the surface treatment with DYNASYLAN® HS systems leads to higher tensile and tear strengths and higher elongation values. The elongation values at tensile strength and tear strength are roughly the same in the case of coated ATH.

The presence of filler in the case of talc (phyllosilicate having a layered structure) has a considerable influence on the test results.

Water Absorption

Example 10

The water absorption of the filled compounds was determined in accordance with DIN EN 608 11-1 and 3. Table 5 summarizes the results.

For this purpose, test pieces (0.5 to 1.5 g) were stored in 50 ml of deionized water at room temperature. The increase in weight was determined by weighing after certain time intervals.

Compounds having the surface-treated filler of the invention display reduced water absorption (with the exception of MDH) compared to nonsilanized filler.

TABLE 4

RESULTS OF THE TENSILE TESTS

| Filler | Filler/EVA ratio (parts by weight) | Coating | Tensile strength (N/mm$^2$) | Elongation at tensile strength (%) | Tear strength (N/mm$^2$) | Elongation at tear strength (%) |
|--------|-----|-----|-----|-----|-----|-----|
| ATH | 60/40 | none | 8.8 | 59 | 6.3 | 161 |
| ATH | 60/40 | 1% of DS HS 2907 | 11.6 | 139 | 10.8 | 177 |
| ATH | 60/40 | 4% of DS HS 2906 | 8.6 | 215 | 8.2 | 250 |
| ATH | 60/40 | 2.5% of DS HS 2781 | 11.5 | 188 | 11.2 | 211 |
| ATH | 60/40 | 2.5% of DS HS 1152 | 10.1 | 158 | 9.9 | 172 |
| MDH | 60/40 | none | 10.4 | 85 | 10.2 | 92 |
| MDH | 60/40 | 1% of DS HS 2907 | 10.1 | 87 | 8.3 | 158 |
| Chalk | 47/53 | none | 11.8 | 923 | 11.6 | 925 |
| Chalk | 47/53 | 1% of DS HS 2907 | 10.7 | 824 | 10.0 | 831 |
| Talc | 47/53 | none | 11.1 | 797 | 11.0 | 799 |
| Talc | 47/53 | 1% of DS HS 2907 | 8.3 | 230 | 8.0 | 318 |

TABLE 5

RESULTS OF THE WATER STORAGE

| Filler | Filler/EVA ratio [parts by weight] | Coating | Water absorption after 1 day [%] | Water absorption after 1 day [% of blank] | Water absorption after 1 week [%] | Water absorption after 1 week [%] |
|---|---|---|---|---|---|---|
| ATH | 60/40 | none | 0.77 | 100 | 2.13 | 100 |
| ATH | 60/40 | 1% of DS HS 2907 | 0.33 | 43 | 0.96 | 45 |
| ATH | 60/40 | 4% of DS HS 2906 | 0.31 | 40 | 1.01 | 48 |
| ATH | 60/40 | 2.5% of DS HS 2781 | 0.24 | 31 | 0.81 | 38 |
| ATH | 60/40 | 2.5% of DS HS 1152 | 0.30 | 40 | 0.75 | 35 |
| MDH | 60/40 | none | 0.12 | 100 | 0.28 | 100 |
| MDH | 60/40 | 1% of DS HS 2907 | 0.16 | 150 | 0.49 | 179 |
| Chalk | 47/53 | none | 0.22 | 100 | 0.35 | 100 |
| Chalk | 47/53 | 1% of DS HS 2907 | 0.10 | 46 | 0.29 | 82 |
| Talc | 47/53 | none | 0.17 | 100 | 0.31 | 100 |
| Talc | 47/53 | 1% of DS HS 2907 | 0.07 | 44 | 0.18 | 57 |

This application is based on German Patent Application 198 18 924.9, filed Apr. 28, 1998, the entire contents of which are hereby incorporated by reference.

Having now fully described the invention, it will be apparent to one of ordinary skill that, given the teachings herein, many changes and modifications can be made thereto without departing from the spirit or scope of the invention as set forth herein.

What is claimed is:

1. A process for preparing a surface-modified filler, comprising:
   mixing a filler with water;
   adding a water-based organosiloxane composition with mixing to form a mixture, wherein the organosiloxane composition comprises a completely hydrolyzed water-soluble organosiloxane comprising at least one OH group, at least one amino-functional group an optional functional group selected from the group consisting of alkyl, haloalkyl, glycidyl ether alkyl, acryloxyalkyl and methacryloxyalkyl, and wherein each silicon atom of the organosiloxane is bonded to said amino-functional group or said functional group; and drying the mixture.

2. The process as claimed in claim 1, when the water-based organosiloxane composition comprises an organosiloxane content of 10 to 150 g of Si/kg of solution.

3. The process as claimed in claim 1, wherein the water-based organosiloxane composition has a pH of 2 to 6.

4. The process as claimed in claim 1, wherein the water-based organosiloxane composition has a pH of 7.5 to 12.

5. The process as claimed in claim 1, wherein the water-based organosiloxane composition comprises alcohol in an amount of less than 0.5% by weight.

6. The process as claimed in claim 1, comprising 0.1 to 12% by weight of organosiloxane per kg of filler.

7. The process as claimed in claim 1, wherein, prior to drying, the mixture has a viscosity of 10 to 20,000 mPa s at a filler content of 10 to 70% by weight.

8. The process as claimed in claim 1, wherein the mixture is dried using a spray drier.

9. The process as claimed in claim 1, wherein the water-soluble organosiloxane includes: (i) aminoalkyl functional groups or (ii) aminoalkyl and alkyl functional groups or (iii) aminoalkyl and vinyl functional groups.

10. The process as claimed in claim 1, wherein the water-soluble organosiloxane includes at least one 3-aminopropyl functional group.

11. The process as claimed in claim 1, wherein the filler is selected from the group consisting of aluminum hydroxide, magnesium hydroxide, dolomite, chalk, talc, kaolin, bentonite, montmorillonite, mica, silica, and titanium dioxide, and mixtures thereof.

12. The process as claimed in claim 1, further comprising blending the surface-modified filler into an adhesive, sealant, polymer composition, paint or surface coating.

13. The process as claimed in claim 1, further comprising blending the surface-modified filler into an ethylene-vinyl acetate copolymer composition.

14. A surface-modified filler, comprising the reaction product of a process comprising:
   mixing a filler with water;
   adding a water-based organosiloxane composition with mixing to form a mixture, wherein the organosiloxane composition comprises a completely hydrolyzed water-soluble organosiloxane comprising as least one OH group, at least one amino-functional group and an optional functional group selected from the group consisting of alkyl, haloalkyl, alkenyl, glycidyl ether alkyl, acryloxyalkyl and methacryloxyalkyl, and wherein each silicon atom of the organosiloxane is bonded to said amino-functional group or said optional functional group; and drying the mixture.

15. The surface-modified filler as claimed in claim 14, wherein the water-soluble organosiloxane includes (i) aminoalkyl functional groups or (ii) aminoalkyl and alkyl functional groups or (iii) aminoalkyl and vinyl functional groups.

16. The surface-modified filler as claimed in claim 14, wherein the water-soluble organosiloxane includes at least one 3-aminopropyl functional group.

17. The surface-modified filler as claimed in claim 14, wherein the filler is selected from the group consisting of aluminum hydroxide, magnesium hydroxide, dolomite, chalk, talc, kaolin, bentonite, montmorillonite, mica, silica, and titanium dioxide, and mixtures thereof.

18. An adhesive, sealant, polymer composition, paint or surface coating, comprising the surface-modified filler as claimed in claim 14.

19. An ethylene-vinyl acetate copolymer composition, comprising the surface-modified filler as claimed in claim 14.

* * * * *